(12) United States Patent
Zhao

(10) Patent No.: US 9,507,473 B2
(45) Date of Patent: Nov. 29, 2016

(54) METHOD FOR PROCESSING TOUCH OPERATION AND MOBILE TERMINAL

(75) Inventor: Dongxiao Zhao, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 207 days.

(21) Appl. No.: 14/381,702

(22) PCT Filed: May 21, 2012

(86) PCT No.: PCT/CN2012/075805
§ 371 (c)(1),
(2), (4) Date: Aug. 28, 2014

(87) PCT Pub. No.: WO2013/127130
PCT Pub. Date: Sep. 6, 2013

(65) Prior Publication Data
US 2015/0054778 A1    Feb. 26, 2015

(30) Foreign Application Priority Data
Feb. 29, 2012    (CN) .......................... 2012 1 0050956

(51) Int. Cl.
*G06F 3/045*    (2006.01)
*G06F 3/044*    (2006.01)
(Continued)

(52) U.S. Cl.
CPC ............... *G06F 3/044* (2013.01); *G06F 3/048* (2013.01); *G06F 3/0488* (2013.01); *G06F 3/04883* (2013.01); *H04M 1/72563* (2013.01)

(58) Field of Classification Search
CPC ...................................................... G06F 3/044
USPC ........................................................ 345/174
See application file for complete search history.

(56) References Cited

U.S. PATENT DOCUMENTS

| | | | |
|---|---|---|---|
| 7,656,393 B2 | 2/2010 | King et al. | |
| 2004/0012572 A1* | 1/2004 | Sowden | G06F 3/03547 345/173 |

(Continued)

FOREIGN PATENT DOCUMENTS

| | | |
|---|---|---|
| CN | 101334705 A | 12/2008 |
| CN | 101984392 A | 3/2011 |

(Continued)

OTHER PUBLICATIONS

International Search Report in international application No. PCT/CN2012/075805, mailed on Nov. 29, 2012. (2 pages).

(Continued)

*Primary Examiner* — Jason Olson
(74) *Attorney, Agent, or Firm* — Oppedahl Patent Law Firm LLC

(57) ABSTRACT

The present disclosure provides a method for processing a touch operation, and the method includes: a touch action of a user in a first sensing area is acquired by a mobile terminal, wherein the first sensing area is located in an area other than a display area of the mobile terminal; when it is determined by the mobile terminal that the acquired touch action is a valid touch action, a function key corresponding to the valid touch action is determined according to a correspondence between the touch action of the user acquired in the first sensing area and a function key, and a corresponding processing is performed according to a determined function key. The present disclosure further provides a mobile terminal. With the method and device provided in the present disclosure, the problem of the prior art that the thickness and screen size of a mobile terminal are limited due to an occupation of some area by keys of the mobile terminal when the volume of the mobile terminal is fixed.

11 Claims, 9 Drawing Sheets

(51) Int. Cl.
*G06F 3/048* (2013.01)
*G06F 3/0488* (2013.01)
*H04M 1/725* (2006.01)

(56) References Cited

U.S. PATENT DOCUMENTS

| | | |
|---|---|---|
| 2006/0238517 A1 | 10/2006 | King et al. |
| 2007/0165002 A1 | 7/2007 | Wassingbo |
| 2009/0295753 A1 | 12/2009 | King et al. |
| 2010/0010706 A1 | 1/2010 | Gormley |
| 2010/0137027 A1* | 6/2010 | Kim ............... G06F 3/03547 455/556.1 |
| 2010/0302172 A1* | 12/2010 | Wilairat ............ G06F 3/04883 345/173 |
| 2011/0167391 A1* | 7/2011 | Momeyer ............ G06F 1/1684 715/863 |
| 2011/0205163 A1* | 8/2011 | Hinckley ............ G06F 3/0483 345/173 |
| 2011/0209098 A1 | 8/2011 | Hinckley |
| 2012/0154408 A1* | 6/2012 | Yukawa ............ G06F 1/1601 345/473 |
| 2013/0154959 A1* | 6/2013 | Lindsay ............ G06F 1/1694 345/173 |

FOREIGN PATENT DOCUMENTS

| | | |
|---|---|---|
| CN | 102117166 A | 7/2011 |
| CN | 102270088 A | 12/2011 |
| JP | 2005122271 A | 5/2005 |
| JP | 2010026638 A | 2/2010 |
| JP | 2010262557 A | 11/2010 |
| JP | 2011119959 A | 6/2011 |
| JP | 2013516703 A | 5/2013 |
| JP | 2013520728 A | 6/2013 |

OTHER PUBLICATIONS

English Translation of the Written Opinion of the International Search Authority in international application No. PCT/CN2012/075805, mailed on Nov. 29, 2012. (10 pages).

Supplementary European Search Report in European application No. 12870013.5, mailed on Nov. 6, 2014. (6 pages).

* cited by examiner

METHOD FOR PROCESSING TOUCH OPERATION AND MOBILE TERMINAL

TECHNICAL FIELD

The present disclosure relates to the field of electronic techniques, and in particular to a method for processing a touch operation and a mobile terminal.

BACKGROUND

With the increasing development of internetwork and information techniques, a mobile terminal changes from a simple audio communication tool to a comprehensive information processing platform integrating entertainment and practicability. An existing mobile terminal not only has functions for audio communication and text messaging, but also supports multimedia function, multimedia messaging service, Internet service and multiple Java programs, providing great convenience to people's modern life.

Since a touch panel has advantages of being sturdy and durable, responsive, space-saving and convenient to implement human-computer interaction, thus it is widely used in various mobile terminals such as a mobile phone, a digital photo frame, a Personal Digital Assistant (PDA), a tablet computer and the like, and replaces gradually a traditional display screen of a mobile terminal. Through a touch panel, functions of a physical keyboard can be simulated, and an Organic Light-Emitting Diode (OLED) display panel is arranged under the touch panel to display key labels. With the application of a touch panel, physical keys of a mobile terminal become fewer and fewer, functions of physical keys are gradually replaced by those of a touch panel, but certain keys of the mobile terminal are not yet replaced, such as Home (main page) key, return key and volume key, therefore there are some area needed to arrange keys on the mobile terminal.

At present, a mobile terminal tends to become thinner and thinner in thickness and larger and larger in screen size, but since keys of a mobile terminal may occupy some area, the thickness and screen size thereof are limited with the volume of the mobile terminal being fixed.

SUMMARY

In view of the above, the present disclosure provides a method for processing a touch operation and a mobile terminal so as to solve the problem of the prior art that the thickness and screen size of a mobile terminal are limited due to an occupation of some area by keys of the mobile terminal when the volume of the mobile terminal is fixed.

The present disclosure provides a method for processing a touch operation, and the method includes:

a touch action of a user in a first sensing area is acquired by a mobile terminal, wherein the first sensing area is located in an area other than a display area of the mobile terminal;

when it is determined by the mobile terminal that the acquired touch action is a valid touch action, a function key corresponding to the valid touch action is determined according to a correspondence between the touch action of the user acquired in the first sensing area and the function key, and a corresponding processing is performed according to the determined function key.

In an embodiment, the first sensing area is arranged in one or more locations on a frame, a lateral surface and the back side of the mobile terminal.

In an embodiment, when the touch action is a click on touch, the correspondence is a correspondence between the number of clicks on a defined click location and a function key;

accordingly, the determining by the mobile terminal that an acquired touch action is a valid touch action may include:

when it is determined by the mobile terminal that the touch action is on the defined click location and the number of the touch actions is equal to a defined number, it is determined that the touch action is a valid touch action.

In an embodiment, when the touch action is a sliding touch, the correspondence is a correspondence between a sliding trail corresponding to the touch action in the first sensing area and a function key;

accordingly, the determining by the mobile terminal that an acquired touch action is a valid touch action may include:

the sliding trail corresponding to the touch action in the first sensing area is determined by the mobile terminal; and when a location relation between the sliding trail and an identification line in the first sensing area meets a defined location relation, it is determined that the touch action is a valid touch action.

In an embodiment, when the touch action is a sliding touch and spans the first sensing area and a second sensing area located in the display area, the correspondence is a correspondence between a sliding trail corresponding to the touch action in the first sensing area and the second sensing area and a function key;

accordingly, the determining by the mobile terminal that the acquired touch action is a valid touch action includes:

the sliding trail corresponding to the touch action in the first sensing area and the second sensing area is determined by the mobile terminal; and when a location relation between the sliding trail and the identification line meets a defined location relation, it is determined that the touch action is a valid touch action.

In an embodiment, after the mobile terminal determines the corresponding function key, the method may further include:

the function key corresponding to the valid touch action is displayed by the mobile terminal in the display area.

The embodiments of the present disclosure provide a mobile terminal, and the mobile terminal includes:

a first sensing area located in an area other than a display area of the mobile terminal;

a first sensor configured to acquire a touch action of a user in the first sensing area; and a processor configured to, when it is determined by the mobile terminal that the acquired touch action is a valid touch action, determine a function key corresponding to the valid touch action according to a correspondence between the touch action of the user acquired by the first sensor in the first sensing area and a function key, and perform a corresponding processing according to a determined function key.

In an embodiment, the first sensing area is arranged in one or more locations on a frame, a lateral surface and the back side of the mobile terminal.

In an embodiment, if the touch action is a click on touch, the processor is configured to, when it is determined by the mobile terminal that the touch action is on a defined click location and the number of the touch actions is equal to a defined number, determine that the touch action is a valid touch action.

In an embodiment, if the touch action is a sliding touch, the processor is configured to: determine a sliding trail corresponding to the touch action in the first sensing area; and when a location relation between the sliding trail and an identification line in the first sensing area meets a defined location relation, determine that the touch action is a valid touch action.

In an embodiment, the mobile terminal further includes:
a second sensing area located in the display area of the mobile terminal;
a second sensor configured to acquire a touch action of a user in the second sensing area located in the display area; and
accordingly, when the touch action is a sliding touch and spans the first sensing area and the second sensing area,
the processor is further configured to: determine a sliding trail of an acquired touch action in the first sensing area and the second sensing area; and when a location relation between the sliding trail and the identification line meets a defined location relation, determine that the touch action is a valid touch action.

In an embodiment, the first sensor is one or more of a capacitive sensor, an infrared sensor, an electromagnetic sensor and a pressure sensor; the second sensor is one or more of a capacitive sensor, an infrared sensor, an electromagnetic sensor and a pressure sensor.

In an embodiment, the mobile terminal further includes:
a display screen configured to display the function key corresponding to the valid touch action.

In embodiments of the present disclosure, according to a correspondence between a touch action of a user in a first sensing area located in an area other than a display area and a function key, a function key corresponding to the valid touch action is determined, and a corresponding processing is performed according to a determined function key, thus function keys don't need to be set on a mobile terminal, so that with a fixed volume the mobile terminal may have a lager screen size and a thinner thickness or with a fixed screen size the mobile terminal may have a smaller volume and a thinner thickness.

DETAILED DESCRIPTION

In the present disclosure, according to a correspondence between a touch action of a user in a first sensing area located in an area other than a display area and a function key, a function key corresponding to the valid touch action is determined, and a corresponding processing is performed according to the determined function key, thus function keys don't need to be set on a mobile terminal.

Embodiments of the present disclosure will be further elaborated below with reference to the accompanying drawings.

Figure 1:
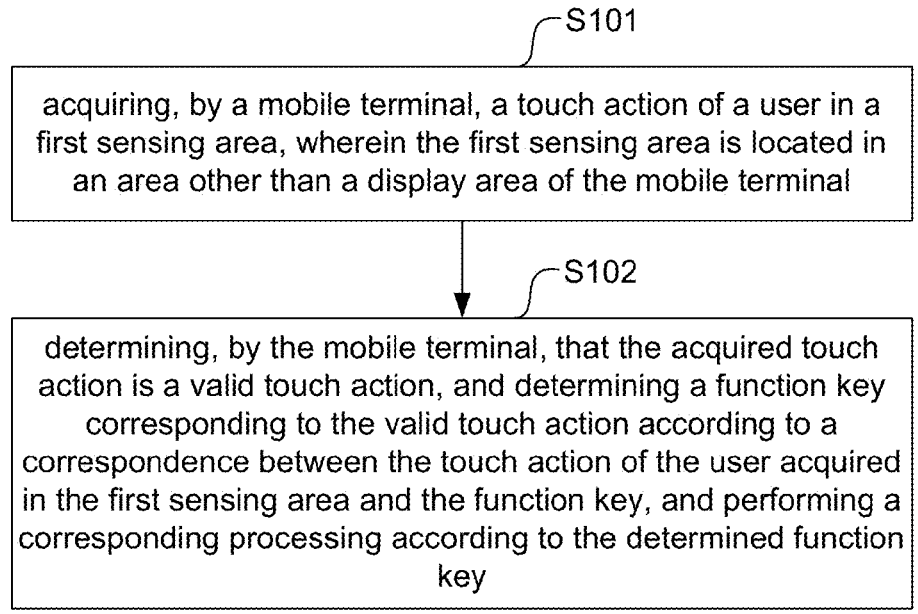
FIG. 1 is a flow chart of a method for processing a first touch operation according to an embodiment of the present disclosure.

As shown in FIG. 1, a method for processing a touch operation according to an embodiment of the present disclosure includes the following steps:

S101, a touch action of a user in a first sensing area is acquired by a mobile terminal, wherein the first sensing area is located in an area other than a display area of the mobile terminal; and S102, when it is determined by the mobile terminal that an acquired touch action is a valid touch action, a function key corresponding to the valid touch action is determined according to a correspondence between the touch action of the user in the first sensing area and a function key, and a corresponding processing is performed according to a determined function key.

Wherein the function key includes and is not limited to one or more of a Home key, a return key, a volume key, a menu key, a wake-up key, a power-on key, a power-off key and the like.

The first sensing area can be arranged in a frame of the mobile terminal, i.e., an area other than a display area on the front side of the mobile terminal, and can also be arranged on a lateral surface of the mobile terminal, and can further be arranged on the back side of the mobile terminal.

In specific implementation, the mobile terminal can acquire through the first sensor a touch action of a user in the first sensing area, wherein the first sensor can be a capacitive sensor, an infrared sensor, an electromagnetic sensor, a pressure sensor and the like.

In specific implementation, there may be multiple first sensing areas so as to meet operations of multiple function keys, and the multiple first sensing areas can be arranged in one or more locations on a frame, a lateral surface and the back side of the mobile terminal.

For simplicity, descriptions will be made by taking one first sensing area as an example, to which the case of multiple first sensing areas is similar and the detailed descriptions thereof will be omitted.

A valid touch action of the user in the first sensing area can be a click on touch, i.e., clicking on a defined location in the first sensing area, it can be a single click or a double click as needed, then the correspondence in S102 is a correspondence between the number of clicks on a defined click location and a function key, i.e., different numbers of clicks on a same defined location correspond to different function keys, or a same number of clicks on different defined locations correspond to different function keys, or different numbers of clicks on different defined locations correspond to different function keys;

accordingly, in S101, the determining that an acquired touch action is a valid touch action includes:

when determining by the mobile terminal that the touch action is on the defined click location and the number of the touch actions is equal to a defined number, determining, by the mobile terminal, that the touch action is a valid touch action.

In specific implementation, after acquiring the touch action of the user in the first sensing area, the mobile terminal determines firstly whether the touch action is a valid touch action, and after determining that the touch action is a valid touch action, proceed to S102; if the touch action is not a valid touch action, the process is ended, i.e., the mobile terminal doesn't respond to the touch action, thereby avoiding maloperations by a user.

For example, if a double click on a defined location on a right frame of a mobile terminal corresponds to a function of a HOME key, when the mobile terminal determines that a user performs a double click operation on the defined location on the right frame, an operation processing of the HOME key is implemented; for another example, if a single click on a defined location on a lateral surface of a mobile terminal corresponds to a function of a return key, when the mobile terminal determines that a user performs a single click operation on the defined location on the lateral surface, an operation processing of the return key is implemented.

In specific implementation, in order to facilitate users' recognition of different function keys, at a defined location in the first sensing area, an identifier for representing a function key corresponding to the defined location can be added, and the identifier can be an icon, a character, a digit and the like.

A valid touch action of a user in the first sensing area can also be a sliding touch in the first sensing area, then the correspondence is a correspondence between a sliding trail corresponding to the touch action in the first sensing area and a function key; for example, a sliding trail corresponding to a sliding touch from top to bottom performed on a defined location in the first sensing area corresponds to a volume down function key; for another example, a sliding trail corresponding to a sliding touch from bottom to top performed on the same defined location in the first sensing area corresponds to a volume up function key.

Accordingly, in S101, the determining by the mobile terminal that an acquired touch action is a valid touch action includes:

the sliding trail corresponding to the touch action in the first sensing area is determined by the mobile terminal; and when a location relation between the sliding trail and an identification line in the first sensing area meets a defined location relation, it is determined by the mobile terminal that the touch action is a valid touch action.

Figure 2:
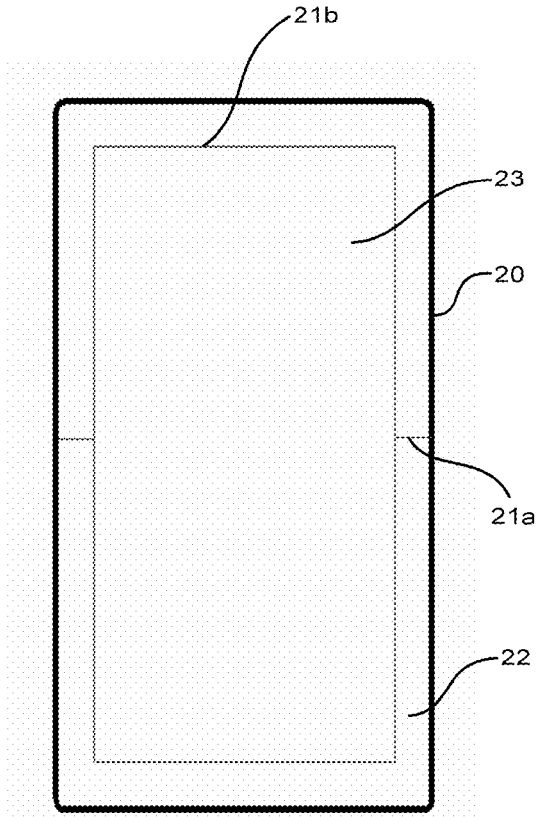
FIG. 2 is a schematic structural diagram of a mobile terminal configured with an identification line according to an embodiment of the present disclosure.

In specific implementation, in order to prevent maloperations by a user in the first sensing area, at least one identification line is arranged in the first sensing area, if the first sensing area is located in a frame area of a mobile terminal, as shown in FIG. 2, the mobile terminal includes a frame 20 and a display area 23, the area between the frame 20 and the display area 23 is namely a frame area 22 in which an identification line is arranged, and the identification line includes a first identification line 21a arranged in the left and right frame area and a second identification line 21b arranged around the display area 23. Alternatively, identification lines according to embodiments of the present disclosure may also be arranged on other locations according to the location of the first sensing area, for example, arranged in the upper and lower frame area; furthermore, it is defined in advance which touch action is a valid touch action, i.e., when a location relation between a sliding trail corresponding to a touch action and an identification line meets a defined location relation, it is determined that the touch action is a valid touch action. Therefore, after acquiring a touch action of a user in the first sensing area, it is determined firstly by the mobile terminal whether the touch action is a valid touch action according to whether a location relation between the touch action and an identification line located in the first sensing area meets a defined location relation;

if the location relation between the touch action and the identification line located in the first sensing area meets the defined location relation, it is determined that the touch action is a valid touch action and proceed to S102;

if the location relation between the touch action and the identification line located in the first sensing area doesn't meet the defined location relation, it is determined that the touch action is not a valid touch action and proceed to S102, and then the process is ended, i.e., the mobile terminal doesn't respond to the touch action, thereby avoiding maloperations of the first sensing area by a user.

The location relation can be defined according to a user's need, taking the first identification line 21a in the right frame area as shown in FIG. 2 as an example, several location relations between a touch action and an identification line will be enumerated and described below, but location relations according to embodiments of the present disclosure are not limited to those of the following embodiments.

Figure 3A:
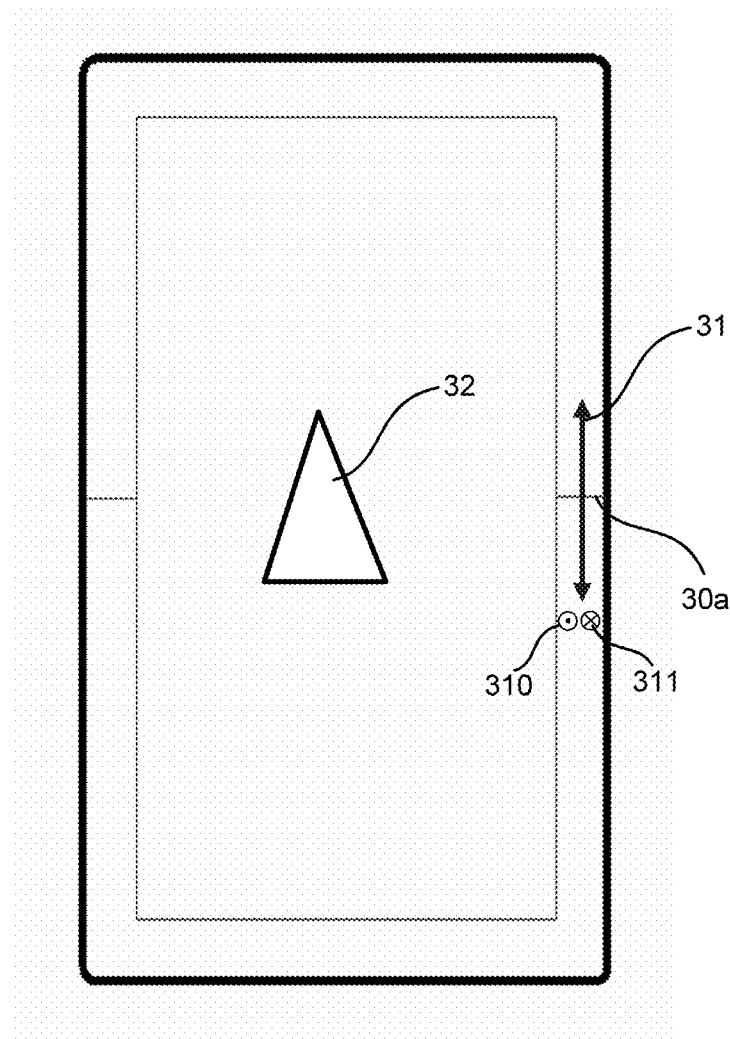
FIG. 3A is a schematic diagram of a first valid touch action according to an embodiment of the present disclosure.
Figure 3B:
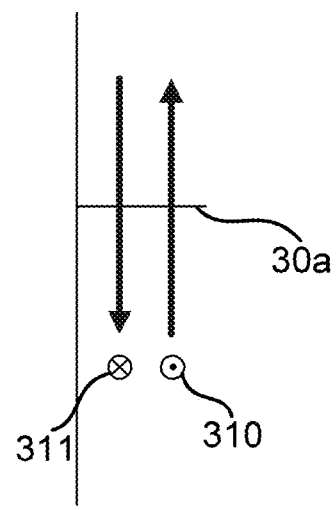
FIG. 3B is a schematic diagram of a trail corresponding to the valid touch action as shown in FIG. 3A.

In a first location relation as shown in FIG. 3A, a starting point 310 and an end point 311 of a trail corresponding to a touch action 31 are both located below a first identification line 30a and the trail passes through the first identification line 30a twice;

specifically, if a trail corresponding to a touch action 31 of a user during a defined time period is sliding from a lower side of a first identification line 30a to the upper side of the first identification line 30a and sliding from the upper side of the first identification line 30a to the lower side of the first identification line 30a as shown in FIG. 3B, it is determined by a mobile terminal that the touch action is a valid touch action;

accordingly, S102 includes: a function key corresponding to the valid touch action is determined by the mobile terminal according to a correspondence between the touch action and a function key, and a corresponding processing is performed according to a determined function key.

Preferably, after a function key corresponding to the valid touch action is determined by the mobile terminal, an icon corresponding to the function key can be displayed in the display area, if the function key corresponding to the valid touch action is a HOME key, an icon 32 corresponding to the HOME key is displayed in the display area as shown in FIG. 3A.

Figure 4A:
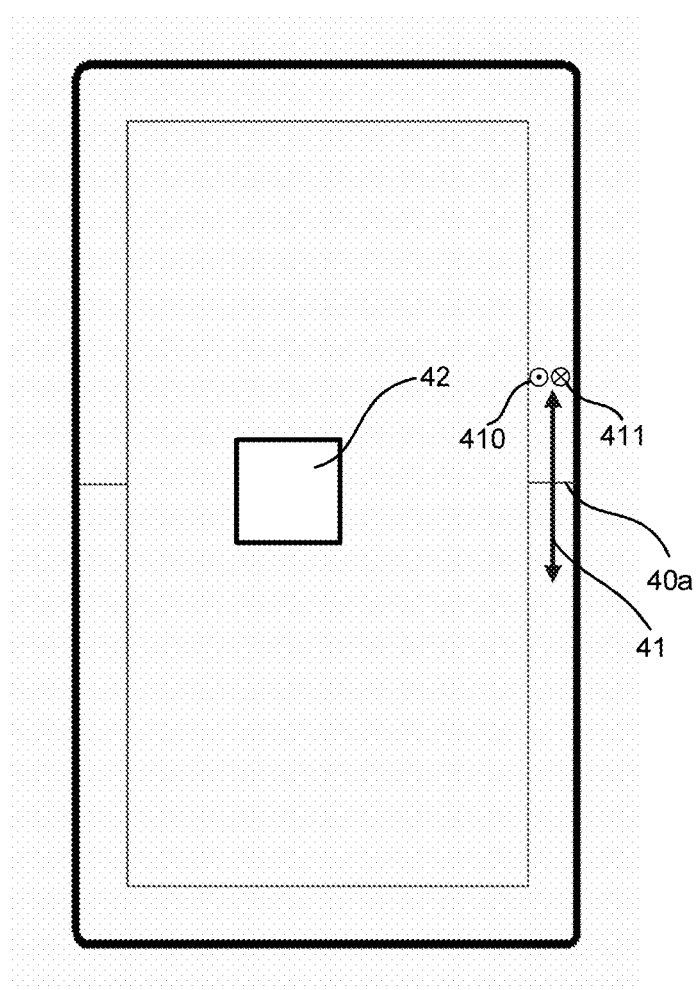
FIG. 4A is a schematic diagram of a second valid touch action according to an embodiment of the present disclosure.
Figure 4B:
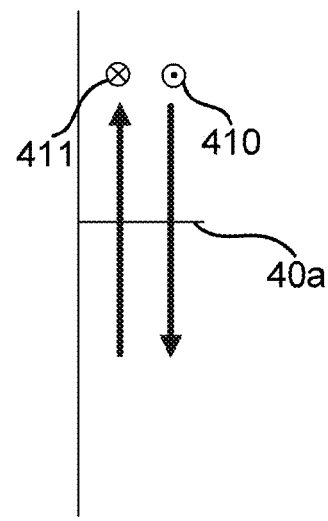
FIG. 4B is a schematic diagram of a trail corresponding to the valid touch action as shown in FIG. 4A.

In a second location relation as shown in FIG. 4A, a starting point 410 and an end point 411 of a trail corresponding to a touch action 41 are both located above a first identification line 40a and the trail passes through the first identification line 40a twice;

specifically, if a trail corresponding to a touch action 41 of a user during a defined time period is sliding from an upper side of a first identification line 40a to the lower side of the first identification line 40a and sliding from the lower side of the first identification line 40a to the upper side of the first identification line 40a as shown in FIG. 4B, it is determined by a mobile terminal that the touch action is a valid touch action;

accordingly, S102 includes: a function key corresponding to the valid touch action is determined by the mobile terminal according to a correspondence between the touch action and a function key, and a corresponding processing is performed according to a determined function key.

Preferably, after a function key corresponding to the valid touch action is determined by the mobile terminal, an icon corresponding to the function key can be displayed in the display area, if the function key corresponding to the valid touch action is a return key, an icon 42 corresponding to the return key is displayed in the display area.

Figure 5A:
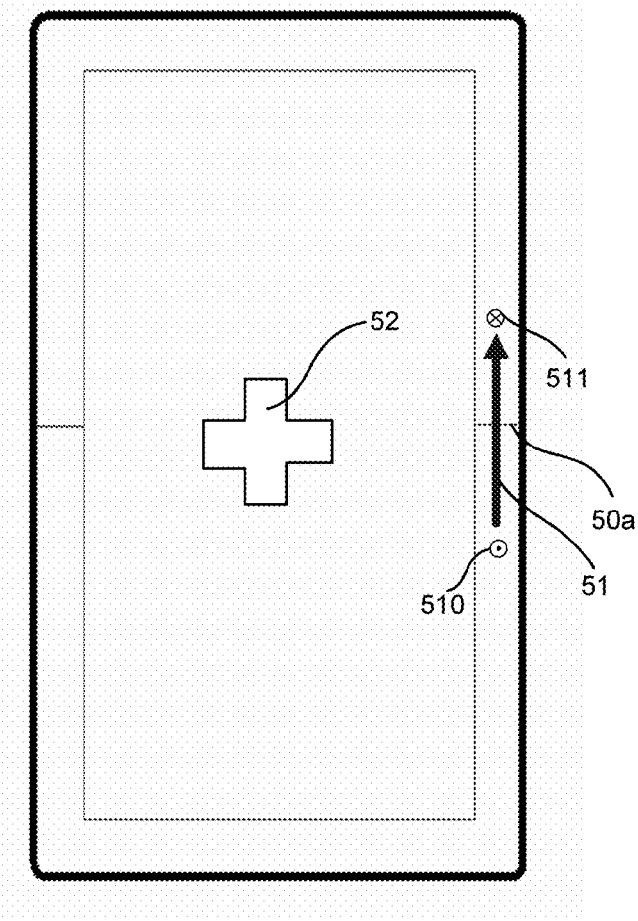
FIG. 5A is a schematic diagram of a third valid touch action according to an embodiment of the present disclosure.
Figure 5B:
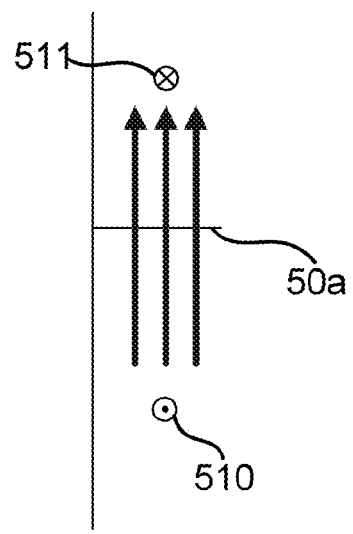
FIG. 5B is a schematic diagram of a trail corresponding to the valid touch action as shown in FIG. 5A.

In a third location relation as shown in FIG. 5A, a starting point 510 of a trail corresponding to a touch action 51 is located below a first identification line 50a, its end point 511 is located above the first identification line 50a, and the trail passes through the first identification line 50a three times;

specifically, if a trail corresponding to a touch action 51 of a user during a defined time period is sliding from a lower side of a first identification line 50a to the upper side of the first identification line 50a and repeating the action twice as shown in FIG. 5B, it is determined by a mobile terminal that the touch action is a valid touch action;

accordingly, S102 includes: a function key corresponding to the valid touch action is determined by the mobile terminal according to a correspondence between the touch action and a function key, and a corresponding processing is performed according to a determined function key.

Preferably, after a function key corresponding to the valid touch action is determined by the mobile terminal, an icon corresponding to the function key can be displayed in the display area, if the function key corresponding to the valid touch action is a volume-up key, an icon 52 corresponding to the volume-up key is displayed in the display area.

Figure 6A:
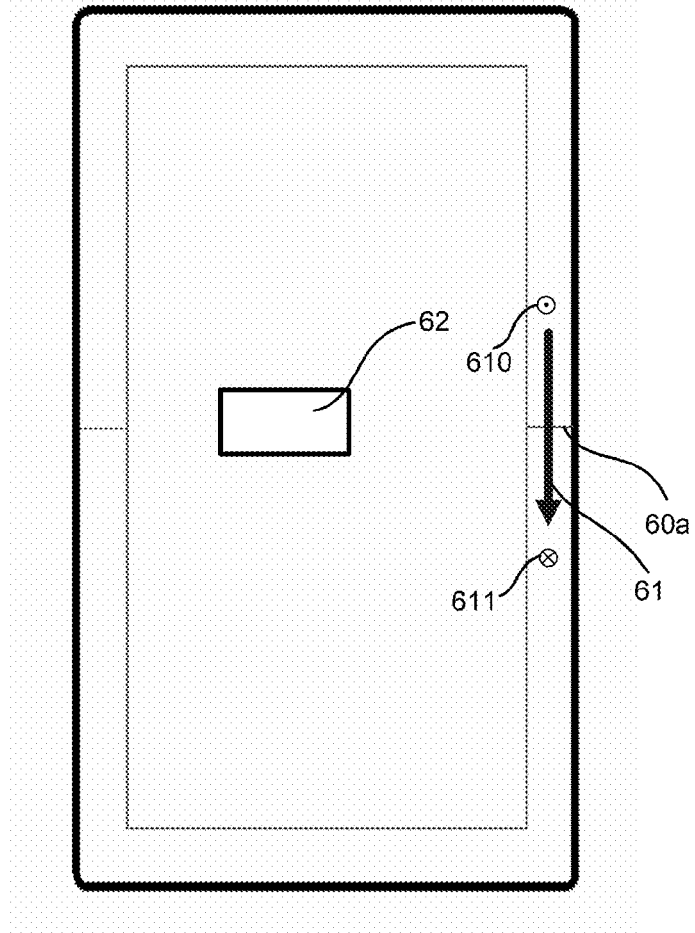
FIG. 6A is a schematic diagram of a fourth valid touch action according to an embodiment of the present disclosure.
Figure 6B:
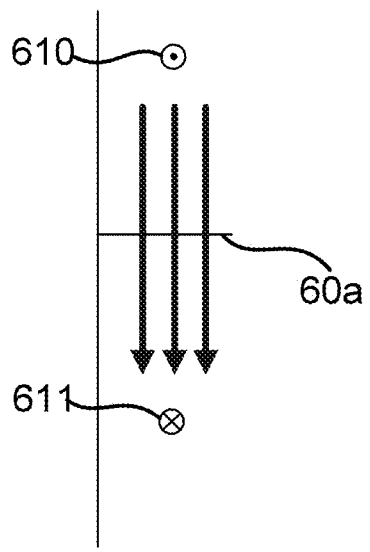
FIG. 6B is a schematic diagram of a trail corresponding to the valid touch action as shown in FIG. 6A.

In a fourth location relation as shown in FIG. 6A, a starting point 610 of a trail corresponding to a touch action 61 is located above a first identification line 60a, its end point 611 is located below the first identification line 60a, and the trail passes through the first identification line 60a three times;

specifically, if a trail corresponding to a touch action 61 of a user during a defined time period is sliding from an upper side of a first identification line 60a to the lower side of the first identification line 60a and repeating the action twice as shown in FIG. 6B, it is determined by a mobile terminal that the touch action is a valid touch action;

accordingly, S102 includes: a function key corresponding to the valid touch action is determined by the mobile terminal according to a correspondence between the touch action and a function key, and a corresponding processing is performed according to a determined function key.

Preferably, after a function key corresponding to the valid touch action is determined by the mobile terminal, an icon corresponding to the function key can be displayed in the display area, if the function key corresponding to the valid touch action is a volume-down key, an icon 62 corresponding to the volume-down key is displayed in the display area.

It should be noted that the above four location relations are only illustrative instead of being restrictive, the location relation between a valid touch action and an identification line can be defined as needed, and the touch action in the above embodiments can also be other touch actions, and a function key corresponding to a touch action can also be defined as needed.

In an embodiment, when a touch action is a sliding touch, the touch action can also span the first sensing area and a second sensing area located in the display area of the mobile terminal, then the correspondence in S101 is a correspondence between a sliding trail corresponding to a touch action in the first sensing area and the second sensing area and a function key.

Accordingly, in S101, the determining by the mobile terminal that an acquired touch action is a valid touch action includes:

the sliding trail corresponding to the touch action in the first sensing area and the second sensing area is determined by the mobile terminal; and when a location relation between the sliding trail and the identification line meets a defined location relation, it is determined by the mobile terminal that the touch action is a valid touch action.

In specific implementation, the mobile terminal can acquire a touch action of a user through a first sensor arranged in the first sensing area and a second sensor arranged in the second sensing area, and determine whether the touch action is a valid touch action according to a defined location relation; when the touch action is a valid touch action, proceed to S102; and when the touch action is not a valid touch action, the process is ended.

wherein the second sensor can be a capacitive sensor, an infrared sensor, an electromagnetic sensor, a pressure sensor and the like.

Taking a first identification line 21a and a second identification line 21b in the right frame area as shown in FIG. 2 as an example, several location relations between a touch action and an identification line will be enumerated and described below, but location relations according to embodiments of the present disclosure are not limited to those of the following embodiments.

Figure 7A:
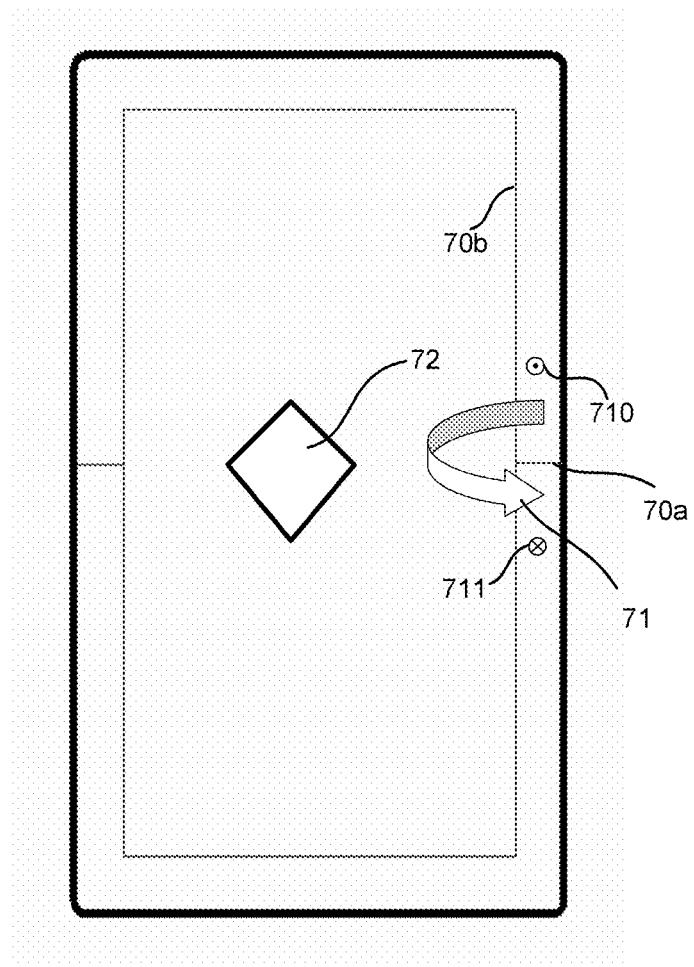
FIG. 7A is a schematic diagram of a fifth valid touch action according to an embodiment of the present disclosure.
Figure 7B:
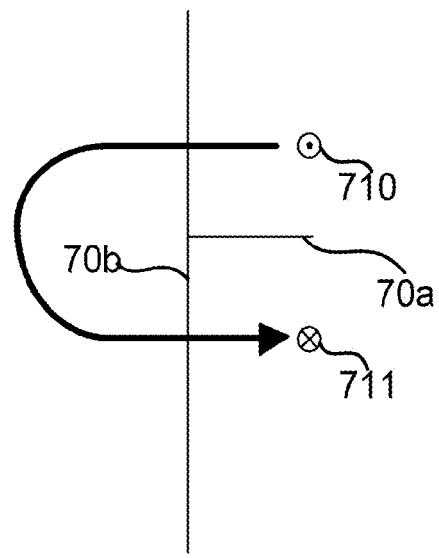
FIG. 7B is a schematic diagram of a trail corresponding to the valid touch action as shown in FIG. 7A.

In a first embodiment as shown in FIG. 7A, a starting point 710 of a trail corresponding to a touch action 71 is located above a first identification line 70a, an end point 711 is located below the first identification line 70a and the trail passes through a second identification line 70b twice;

specifically, if a trail corresponding to a touch action 71 of a user during a defined time period is sliding from an upper side of a first identification line 70a via a second identification line 70b to a second sensing area of the display area, and sliding incessantly from the second sensing area via the second identification line 70b to a lower side of the first identification line 70a as shown in FIG. 7B, it is determined by a mobile terminal that the touch action is a valid touch action;

accordingly, S102 includes: a function key corresponding to the valid touch action is determined by the mobile terminal according to a correspondence between the touch action and a function key, and a corresponding processing is performed according to a determined function key.

Preferably, after a function key corresponding to the valid touch action is determined by the mobile terminal, an icon corresponding to the function key can be displayed in the display area, if the function key corresponding to the valid touch action is a menu key, an icon 72 corresponding to the menu key is displayed in the display area.

Figure 8A:
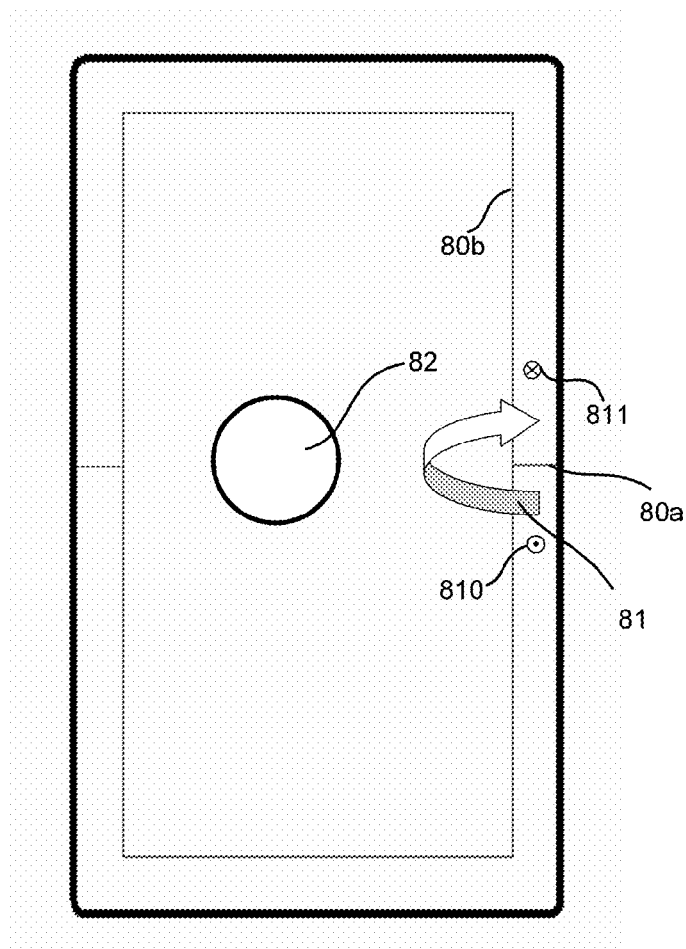
FIG. 8A is a schematic diagram of a sixth valid touch action according to an embodiment of the present disclosure.
Figure 8B:
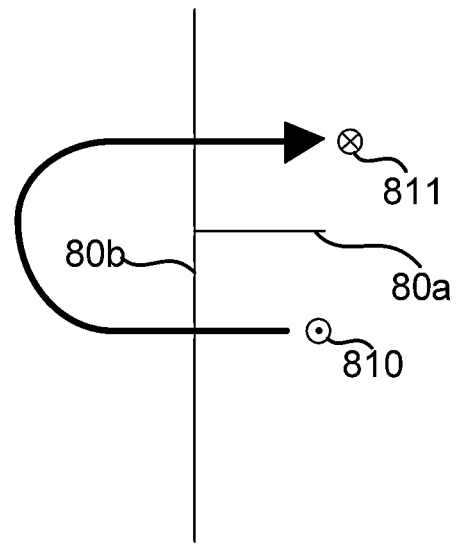
FIG. 8B is a schematic diagram of a trail corresponding to the valid touch action as shown in FIG. 8A.

In a second embodiment as shown in FIG. 8A, a starting point 810 of a trail corresponding to a touch action 81 is located below a first identification line 80a, an end point 811 is located above the first identification line 80*a* and the trail passes through a second identification line 80*b* twice;

specifically, if a trail corresponding to a touch action 81 of a user during a defined time period is sliding from a lower side of a first identification line 80*a* via a second identification line 80*b* to a second sensing area of the display area, and sliding incessantly from the second sensing area via the second identification line 80*b* to an upper side of the first identification line 80*a* as shown in FIG. 8B, it is determined by a mobile terminal that the touch action is a valid touch action;

accordingly, S102 includes: a function key corresponding to the valid touch action is determined by the mobile terminal according to a correspondence between the touch action and a function key, and a corresponding processing is performed according to a determined function key.

Preferably, after a function key corresponding to the valid touch action is determined by the mobile terminal, an icon corresponding to the function key can be displayed in the display area, if the function key corresponding to the valid touch action is a wake-up key, an icon 82 corresponding to the wake-up key is displayed in the display area.

It should be noted that the above embodiments of the two location relations are only illustrative instead of being restrictive, the location relation between a valid touch action and an identification line can be defined as needed, and the touch action in the above embodiments can also be other touch actions, and a function key corresponding to a touch action can also be defined as needed.

Based on the same inventive concept, embodiments of the present disclosure further provide a mobile terminal, since the principle for the mobile terminal to solve the problem of the prior art is similar to that of the method for processing a touch operation, see the implementation of method for implementation of the mobile terminal, and duplicated details thereof will be omitted.

Figure 9A:
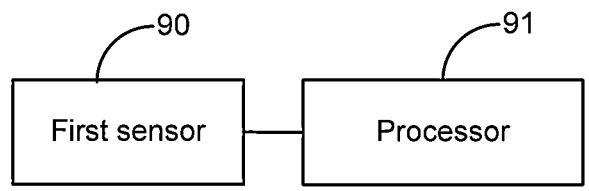
FIG. 9A is a schematic structural diagram of a first mobile terminal according to an embodiment of the present disclosure.

The embodiments of the present disclosure provide a mobile terminal, as shown in FIG. 9A the mobile terminal includes:

a first sensing area located in an area other than a display area of the mobile terminal;

a first sensor 90 configured to acquire a touch action of a user in the first sensing area; and a processor 91 configured to, when it is determined by the mobile terminal that an acquired touch action is a valid touch action, determine a function key corresponding to the valid touch action according to a correspondence between the touch action of the user in the first sensing area and a function key, and perform a corresponding processing according to a determined function key.

Preferably, the first sensing area is arranged in one or more locations on a frame, a lateral surface and the back side of the mobile terminal.

Preferably, the processor 91 is specifically configured to:

when the touch action is a click on touch, it is determined that the touch action is on a defined click location and the number of the touch actions is equal to a defined number, determine that the touch action is a valid touch action.

Preferably, the processor 91 is specifically configured to:

when the touch action is a sliding touch, determine a sliding trail corresponding to an acquired touch action in the first sensing area; and when a location relation between the sliding trail and an identification line in the first sensing area meets a defined location relation, determine that the touch action is a valid touch action.

Preferably, the first sensor 90 is one or more of a capacitive sensor, an infrared sensor, an electromagnetic sensor and a pressure sensor.

Figure 9B:
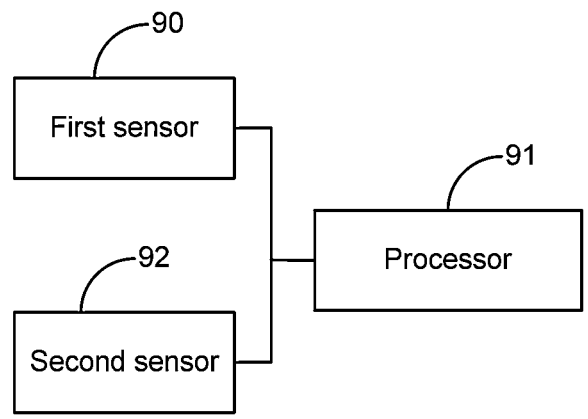
FIG. 9B is a schematic structural diagram of a second mobile terminal according to an embodiment of the present disclosure.

Preferably, as shown in FIG. 9B, the mobile terminal according to embodiments of the present disclosure further includes:

a second sensing area located in the display area of the mobile terminal;

a second sensor 92 configured to acquire a touch action of a user in the second sensing area; and The processor 91 is further configured to:

when the touch action is a sliding touch and the touch action spans the first sensing area and a second sensing area located in the display area, determine a sliding trail of an acquired touch action in the first sensing area and the second sensing area; and when a location relation between the sliding trail and the identification line meets a defined location relation, determine that the touch action is a valid touch action.

Preferably, the first sensor 90 is one or more of a capacitive sensor, an infrared sensor, an electromagnetic sensor and a pressure sensor; the second sensor 92 is one or more of a capacitive sensor, an infrared sensor, an electromagnetic sensor and a pressure sensor.

Figure 9C:
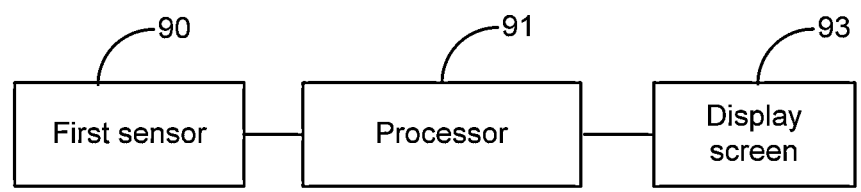
FIG. 9C is a schematic structural diagram of a third mobile terminal according to an embodiment of the present disclosure.
Figure 9D:
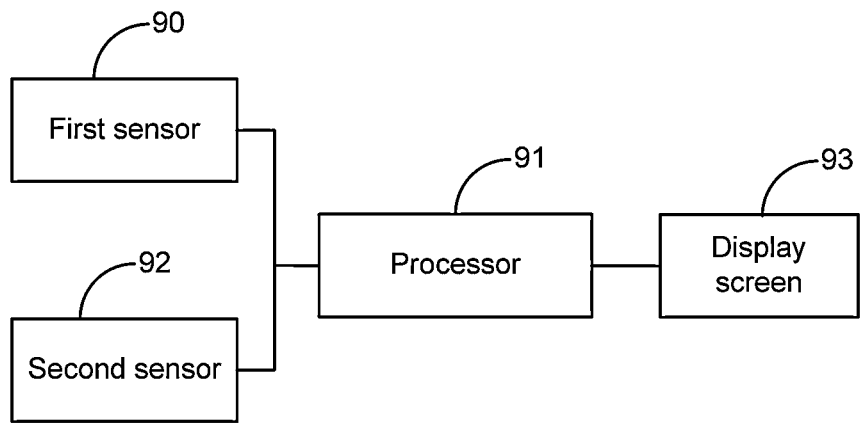
FIG. 9D is a schematic structural diagram of a fourth mobile terminal according to an embodiment of the present disclosure.

Preferably, as shown in FIG. 9C and FIG. 9D, the mobile terminal according to embodiments of the present disclosure further includes:

a display screen 93 configured to display the function key corresponding to the valid touch action.

Although only preferable embodiments of the present disclosure are described, once those skilled in the art know the basic inventive concept, they can make other modifications and changes to these embodiments. Thus the accompanying claims are intended to include preferable embodiments and all changes and modifications within the scope of protection of the present disclosure.

In embodiments of the present disclosure, according to a correspondence between a touch action of a user in a first sensing area located in an area other than a display area and a function key, a function key corresponding to the valid touch action is determined, and a corresponding processing is performed according to a determined function key, thus a function key area doesn't need to be set on a mobile terminal, so that with a fixed volume the mobile terminal may have a lager screen size and a thinner thickness or with a fixed screen size the mobile terminal may have a smaller volume and a thinner thickness.

It is obvious that various changes and variations can be made by those skilled in the art without departing from the scope of the present disclosure. In this way, if these modifications and variations fall within the scope of the claims and equivalent techniques, the present disclosure is intended to include these changes and variations.

The invention claimed is:

1. A method for processing a touch operation, comprising:
   acquiring, by a mobile terminal, a touch action of a user in a first sensing area, wherein the first sensing area is located in an area other than a display area of the mobile terminal;
   determining, by the mobile terminal, that the acquired touch action is a valid touch action, and determining a function key corresponding to the valid touch action according to a correspondence between the touch action of the user acquired in the first sensing area and the function key, and performing a corresponding processing according to the determined function key;

wherein at least one identification line is arranged in the first sensing area;

when the touch action is a sliding touch, the correspondence is a correspondence between a sliding trail corresponding to the touch action in the first sensing area and a function key;

the step of determining, by the mobile terminal, that the acquired touch action is a valid touch action comprises:

determining, by the mobile terminal, the sliding trail corresponding to the touch action in the first sensing area; and when a location relation between the sliding trail and an identification line in the first sensing area meets a defined location relation, determining, by the mobile terminal, that the touch action is a valid touch action.

2. The method according to claim 1, wherein the first sensing area is arranged in one or more locations on a frame, a lateral surface and the back side of the mobile terminal.

3. The method according to claim 2, after the mobile terminal determines the corresponding function key, the method further comprises:

displaying, by the mobile terminal, in the display area the function key corresponding to the valid touch action.

4. The method according to claim 1, wherein when the touch action is a sliding touch and spans the first sensing area and a second sensing area located in the display area, the correspondence is a correspondence between a sliding trail corresponding to the touch action in the first sensing area and the second sensing area and a function key;

the step of determining, by the mobile terminal, that the acquired touch action is a valid touch action comprises:

determining, by the mobile terminal, the sliding trail corresponding to the touch action in the first sensing area and the second sensing area; and when a location relation between the sliding trail and the at least one identification line meets a defined location relation, determining, by the mobile terminal, that the touch action is a valid touch action.

5. The method according to claim 1, after the mobile terminal determines the corresponding function key, the method further comprises:

displaying, by the mobile terminal, in the display area the function key corresponding to the valid touch action.

6. A mobile terminal, comprising:

a first sensing area located in an area other than a display area of the mobile terminal; wherein at least one identification line is arranged in the first sensing area;

a first sensor configured to acquire a touch action of a user in the first sensing area; and a processor configured to, when it is determined by the mobile terminal that the acquired touch action is a valid touch action, determine a function key corresponding to the valid touch action according to a correspondence between the touch action of the user acquired by the first sensor in the first sensing area and a function key, and perform a corresponding processing according to a determined function key;

when the touch action is a sliding touch, the processor is configured to: determine a sliding trail corresponding to the touch action in the first sensing area; and when a location relation between the sliding trail and an identification line in the first sensing area meets a defined location relation, determine that the touch action is a valid touch action.

7. The mobile terminal according to claim 6, wherein the first sensing area is arranged in one or more locations on a frame, a lateral surface and the back side of the mobile terminal.

8. The mobile terminal according to claim 7, further comprising:

a display screen configured to display the function key corresponding to the valid touch action.

9. The mobile terminal according to claim 6, further comprising:

a second sensing area located in the display area of the mobile terminal;

a second sensor configured to acquire a touch action of a user in the second sensing area; and when the touch action is a sliding touch and spans the first sensing area and the second sensing area, the processor is further configured to: determine a sliding trail of an acquired touch action in the first sensing area and the second sensing area; and when a location relation between the sliding trail and the at least one identification line meets a defined location relation, determine that the touch action is a valid touch action.

10. The mobile terminal according to claim 9, wherein the first sensor is one or more of a capacitive sensor, an infrared sensor, an electromagnetic sensor and a pressure sensor;

the second sensor is one or more of a capacitive sensor, an infrared sensor, an electromagnetic sensor and a pressure sensor.

11. The mobile terminal according to claim 6, further comprising:

a display screen configured to display the function key corresponding to the valid touch action.

* * * * *